United States Patent [19]

Maben

[11] Patent Number: 4,572,250

[45] Date of Patent: Feb. 25, 1986

[54] RIBBON CABLE WIRE END FORMING TOOL

[75] Inventor: Duane K. Maben, Clear Lake, Iowa

[73] Assignee: Sperry Corporation, New York, N.Y.

[21] Appl. No.: 738,522

[22] Filed: May 23, 1985

Related U.S. Application Data

[60] Continuation of Ser. No. 526,569, Oct. 14, 1983, abandoned, Division of Ser. No. 268,048, May 28, 1981, abandoned.

[51] Int. Cl.⁴ .............................................. B21F 1/00
[52] U.S. Cl. ..................................... 140/105; 33/192; 72/413; 83/691
[58] Field of Search ................... 33/162, 192; 199/50, 199/51; 140/1, 105; 83/640, 641, 687, 691; 72/385, 413, 473, 478, 41, 43; 81/9.51; 29/748, 749, 857, 861, 862, 863, 566, 566.1, 566.2, 566.3

[56] References Cited

U.S. PATENT DOCUMENTS

| | | | |
|---|---|---|---|
| 565,515 | 8/1896 | Scudder | 199/51 |
| 676,306 | 6/1901 | Fletcher | 199/51 |
| 1,650,653 | 11/1927 | Reiman | 33/162 |
| 1,996,217 | 4/1935 | Steiner | 33/192 |
| 2,341,741 | 2/1944 | Putnam | 33/192 |
| 2,729,356 | 1/1956 | Gookin | 33/192 |
| 3,696,515 | 10/1972 | Tuskos | 33/192 |

Primary Examiner—Lowell A. Larson
Attorney, Agent, or Firm—William C. Fuess; Glenn W. Bowen

[57] ABSTRACT

A cyclical machine forming tool utilizes positionally justified form knives so that, nominally, a selected 80 out of 120 total stripped wire ends of flat ribbon cable may be selectively simultaneously formed, for bent, into a contour such as is useful for soldered attachment to printed circuit cards. Positional justification of wire-forming hammer elements called form knives, nominally 41 in number, across a variable distance, nominally 1.676±0.009 inches, is expediently repetitively accurately accomplished by wedging them apart with interspersed counterposed knife elements, nominally 40 in number, called adjuster knives. Two such tools may be deployed back to back in staged sequence with other ribbon cable positioning, clamping, severing, and end stripping elements so that a multi-conductor flat ribbon cable may be severed at a desired length, have conductors stripped of insulation on both severed ends, and have stripped conductor wires of both ends selectively formed in an efficient semi-automated process.

20 Claims, 7 Drawing Figures

RIBBON-CABLE WIRE END FORMING TOOL

This application is a continuation of application Ser. No. 526,569, now abandoned, which is a divisional of application Ser. No. 268,048, filed May 28, 1981, now abandoned.

BACKGROUND OF THE INVENTION

Multi-wire conductor flat ribbon cable is an electrical interconnection economical in cost, space and weight. It is in widespread usage in digital computer systems wherein the multiple conductors of a stripped cable end are soldered directly onto a printed circuit board. To improve the density of the ribbon cable and the associated interconnects to printed circuit lands, small wires are very close together—on the order of 0.0050 inches separation between 0.0095 inches diameter wire conductors. At such densities some stripped conductors of the ribbon cable are often displaceably formed, or bent, into positions above and/or below the plane of the ribbon cable. Such displaced positions permit lower, workable, densities when the wire ends are connected to printed circuit boards.

The most basic and straightforward method of preparing such a ribbon cable end is as follows. The cable is cut to the desired length with the ends square. The insulation is stripped from the conductors about 0.125 inch using a carpenters type wire stripper or the like. The wire ends are individually formed, as selectively desired, by manually aligning each selected conductor between a forming hammer and an anvil form block and individually displaceably forming it as by a manual stroke.

The basic method of end forming the conductors individually, or at most in small groups much less than the total ribbon cable width of 80 or more conductors, is resistant to being improved upon by a solid comb type multiconductor simultaneous forming tool because of tolerance problems. The tolerance problem is that, because the conductor wires are not spaced with exact consistency within the cable and because the width of the cable from first wire to last wire may vary, if a single conductor wire is precisely positioned over a single position of a multiple position simultaneous forming tool then a remote conductor wire, due to spacing variations, will not be in correct position to be controllably correctly formed. In other words, the industry standard workpiece ribbon cable exhibits greater variation across its width than can be tolerated by a solid comb type multiconductor simultaneous forming tool otherwise capable of forming fine conductors at close proximity.

An example of the tolerance problem is that occurring in end forming of a flat ribbon cable of 120 conductor wires of nominal 0.0095 inches diameter and at a nominal spacing of 0.0045 inches between wires. A flat ribbon cable of 120 such wires separated by 119 such spaces would thereby total 1.676 inches from the centerline of the first to the centerline of the last conductor wire. Actual measurements show that this nominal width of 1.676 inches will vary by ±0.009 inches. Such a deviation of less than 1% and less than 0.01 of an inch is not surprising for a cable mass produced by the mile. If it is desired to capture the individual wires between the teeth of a comb type block and anvil forming tool so that they may be selectively formed, the teeth must penetrate within the 0.0045 inch spaces. If a first space tooth is exactly centered, the 119th space tooth will not reliably fall into the space between the 119th and 120th wires. If no attempt to separate and guide the conductors is made, as by using only a flat anvil with serration spaces for those selected conductors not to be formed, the problem still exists.

During the explanation of the present inventive solution to this problem, it will be seen that a mechanical device involving two sets of knives will be disclosed as an apparatus for evenly dividing an interval of undetermined and variable length. Prior art utilization of one set of knives exists in a linotype machine. When typeset words, which represent several lengths, are formed across a line of fixed length then the spaces between all such word lengths may be evenly adjusted by forcing separator knives evenly between such word lengths. For example, three knives may be evenly forced into the three spaces between four words on a typeset line in order to effectuate even separation. This function of a knife edge to effectuate even separation will become obvious as the present invention is discussed.

These prior art linotype machine knives will be seen to differ from the present invention which utilizes two intermeshing sets of knives, not one set. The function of the present invention is to divide and partition into various integral multiples of even parts an overall interval of undetermined and variable length, not to evenly separate variable lengths along a fixed interval.

SUMMARY OF THE INVENTION

The present invention utilizes a justifying type form comb tool wherein movable forming elements, called form knives, can be accurately positioned over, and subsequently correctly form, the selected conductors during forming of the stripped wire ends of a flat ribbon cable. The form knives are particularly shaped hammer elements (the part which is movable relative to a fixed anvil form block) arrayed across the width of the ribbon cable. In the preferred embodiment 41 identical sequential form knives are utilized to contact 39 pairs (78 wires) and 2 end wires of a 120 wire ribbon cable. The 80 wires so contacted are formed, and 40 wires are left straight. The principle of the invention will be seen to permit other sizes and combinations. The form knives are initially constrained to move normal to the plane of the ribbon cable (the "Z" axis) and always constrained from movement along the length of the ribbon cable (the long axis of the plane of the flat ribbon cable or "X" axis). The entire sequential array of form knives and the form knives individually can be, within constraints, moved across the width of the ribbon cable (the short axis of the plane of the flat ribbon cable, or "Y" axis). A first forming knife is manually visually positioned over an edge conductor of the ribbon cable. All remaining forming knives are adjusted to be evenly staged along the width of the ribbon cable, and correctly positioned over the wires (wire pairs) which will be formed, by a single control operating in conjunction with tapered wedges, called adjuster knives, interspersed between all form knives. In the preferred embodiment there are 40 adjuster knives evenly interspersed between the 41 form knives. The form knives may be considered to be an (N+1)-plurality of "first knife elements", or simply "first elements", between which are interspersed an (N)-plurality of "second knife elements", or "wedge elements". The linear array of form and adjuster knives are under compressive spring pressure. The adjuster knives are controllably forced as wedges between the form knives to separate the form knives against the spring pressure. When the end, or last, forming knife is controllably positioned over the opposite edge conductor of the ribbon cable then all of the form knives in the linear array will be evenly separated across the width of, and atop the wire conductors of, the flat ribbon cable. When the entire form knife array is subsequently lowered in a hammering stroke the individual knives will simultaneously form, or bend, the wires thereunder.

In the preferred embodiment of the invention 38 of the 40 total form knives will be used to form, or bend, two conductor wires each. This double wire forming per single knife is purely a function of the type of ribbon cable ends which are being prepared—mainly, a succession of two wires formed followed by a two wires straight, or unformed. The invention can employ form knives sufficient to contact and form the wires individually. If a form knife is truncated in its physical length such that it cannot contact the individual wire(s) disposed thereunder, then that positional places(s) in the linear array of form knives will be held but no wire forming will transpire at that location. An improvement to the wire contacting heads of the form knives is also possible. If such heads are concave, or grooved, along the axis of the wire conductors ("X" axis) then they will capture and guide the wires with greater certainty during the forming operation. This is useful if the wires are not spaced consistantly across the width of the ribbon cable.

The summary effect of the invention is to create a forming tool with a forming head which is justified, or arranged, to besuit the exact spacing of flat ribbon cable multiple wire conductor ends which are being formed. This justification is necessary because the variations in the total dispersion of conductors across the width of such ribbon cable are greater than will permit a single solid forming head to accurately contact and simultaneously form all wires at all locations. The present invention utilizes tapered adjustable knives so that the justified forming head may quickly, simply, accurately, and reusably be configured, used and reconfigured.

It is a first object of the present invention to show the apparatus of a justifying type multiconductor ribbon cable wire end forming tool and the method of using such tool.

It is a second object of the present invention to show an improved, concave, hammer head on the forming elements which improves the reliability of contact with each of one or more wires to be formed by such forming element.

It is a third object of the present invention to show an apparatus and method for the semiautomated cutting, stripping, and end forming of multiconductor ribbon cable.

It is a fourth object of the present invention to show an apparatus and method whereby successive intervals of unmeasured and variable length may be readily repetitively divided into successive sequential segments each of which is in length an integral multiple of a common fraction 1/N of the total interval length. This mechanical method of partitioning a length will physically locate N+1 identically wedge edged movable elements, called form knives, at positions physically demarking N even segments, or subintervals, along the total interval length. The position demarking elements, called form knives, can be modified by truncation, sharpening, pointing, or the like to adaptively demark segments commencing at a certain integral fraction of the total interval length. For example, the variable interval partitioning apparatus and method which is the fourth object of this invention will readily repetitively allow a segment commencing at 23/40 of an interval length and running for 9/40 along that interval to be located and, with suitable shaping of the heads of the form knife demarking elements, marked as in the formation of a rule or scale.

DESCRIPTION OF THE PREFERRED EMBODIMENT

Figures 1A, 1B:
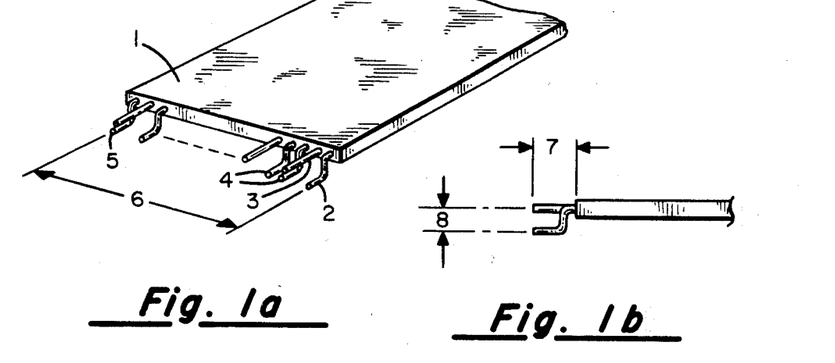
FIG. 1a shows the flat ribbon cable workpiece.
FIG. 1b shows a side view of the workpiece in order that the dimensions of the formed wires may be observed.

The present invention of a ribbon cable form tool operates on a flat ribbon cable workpiece as shown in FIGS. 1a and 1b. The ribbon cable 1 nominally contains 120 wire conductors of 0.0095 inches diameter each at a separation of approximately 0.0050 inches between conductors. The total distance from the centerline of the first to the centerline of the last conductor is dimension 6 of $1.676 \pm 0.009$ inches, with the $\pm 0.009$ inches tolerance due to normal variations in manufacture. The workpiece ribbon cable 1 is shown in its stripped and formed condition wherein the stripped length 7 is approximately 0.125 inches and the displacement 8 of the wires when formed is approximately 0.062 inches below the plane of the ribbon cable. All these dimensions are shown and discussed not as limitations on the performance of the present invention, but quite the opposite, as indices of the fine dimensions and tight tolerance within which it will accurately perform.

The arbitrary forming which is impressed upon the workpiece ribbon cable by the preferred embodiment invention is shown in FIG. 1a. The first wire 2 and the last wire 5, or 120th conductor, are formed below the plane of the ribbon cable. Interior of these edge connectors there are alternate single straight wires, such as straight wire 3, and formed pairs, such as formed pair 4. Thus the arbitrary configuration formed will consist of two formed single edge wires, forty straight wires, and thirty-nine formed pairs. It may thus be considered that forming transpires in forty-one (two edge plus thirty-nine interior) equally spaced locations. The preferred embodiment of the invention to be discussed in conjunction with FIG. 2 will so form at forty-one equally spaced locations. As will become obvious, however, this arbitrary configuration is not integral to the present invention. Specifically, the following should be kept in mind as the invention is discussed. The end conductors need not be formed. The conductors need not be formed by pairs, but may be individually formed. Forming need not be symmetrical and regular across the width of the flat ribbon cable—there may be selectively unformed individual conductors up to entire sections of the cable. All such selectable forming will be controlled by a hammer element within the present invention called a form knife.

Figure 2:
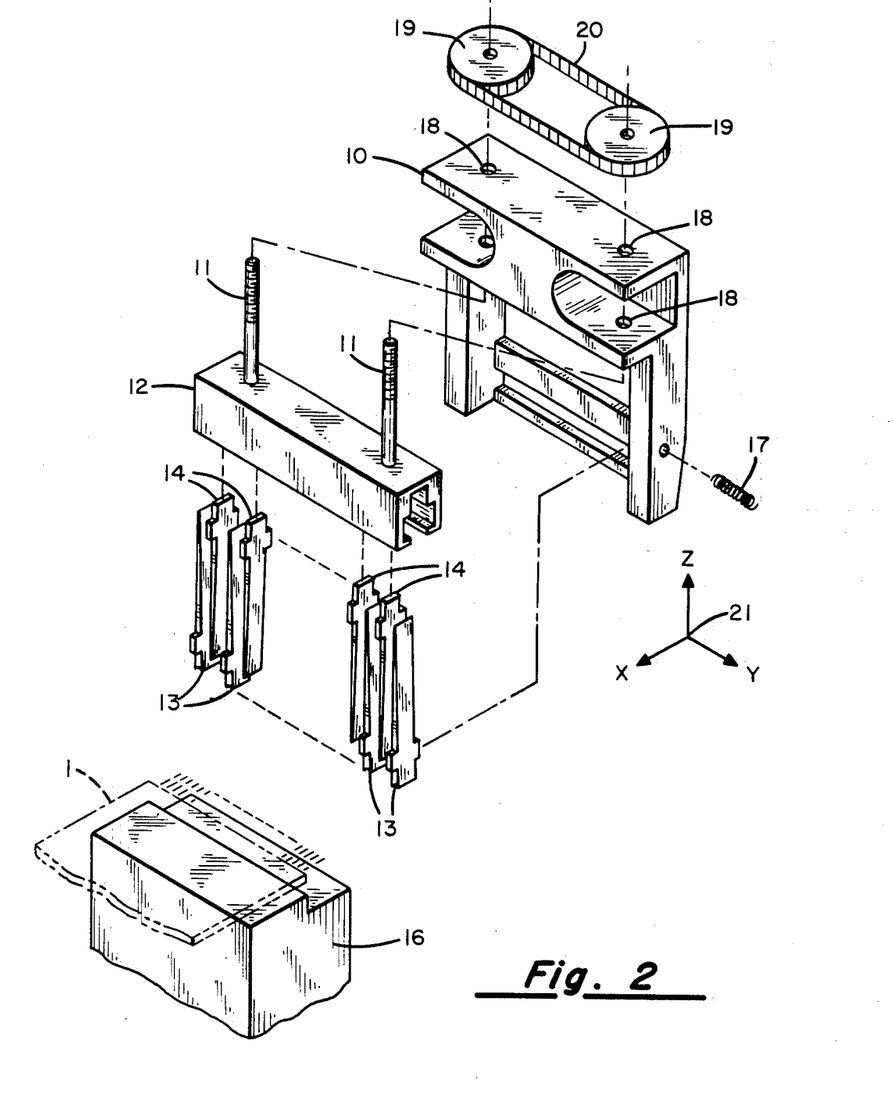
FIG. 2 shows the ribbon cable form tool forming head of the present invention.

The present invention of a ribbon cable form tool is shown in FIG. 2. The three orthogonal axis of the diagram are represented as X, Y and Z in axis indicator 21. The X axis may be considered a first direction which is orthogonal to the Z axis which may be considered a second direction, which are both orthogonal to the Y axis which may be considered a third direction. The form head housing 10 supports the entire form head apparatus and, during the hammering or forming operation, maintains a fixed relationship directly above (the Z axis) the anvil, or form block 16. The channel lift assembly 12 is raised or lowered in the Z axis by the threaded rods 11. It does not matter whether the blocks connecting channel lift assembly 12 to threaded rods 11 are traveling or fixed. In the preferred embodiment channel lift assembly 12 remains disposed at the lower ends of rotatable threaded rods 11 and the rods themselves are moved up and down within form head housing 10 due to rotation of internally threaded chain sprocket wheels 19.

Figure 3A:
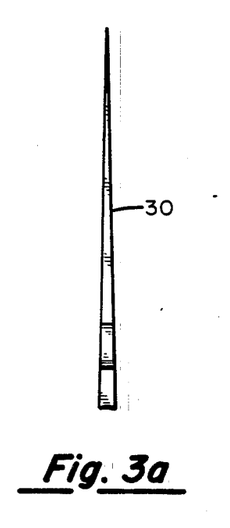
FIG. 3a shows a first side perspective of a form or justifier knife as is used in the ribbon cable form tool.
Figure 3B:
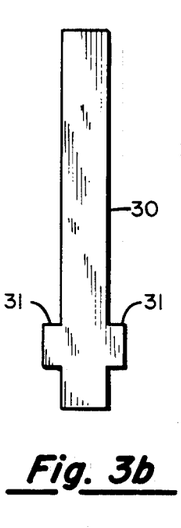
FIG. 3b shows a second side view of a form or justifier knife.

The channel lift assembly 12 contains forty adjuster knives 14. Momentarily referring to FIG. 3a and 3b, the typical construction of knife 30, which may be either one of adjuster knives 14 or form knives 13 as shown in FIG. 2, may be observed. Each knife 30 has tabs 31. Returning to FIG. 2, the tabs on the adjuster knives 14 and the walls of the channel lift assembly 12 constrain these knives from movement in the X axis direction. They may be moved in the Z axis direction by raising and lowering channel lift assembly 12 within which they are held. The adjuster knives 14 can slide in the Y axis direction within channel lift assembly 12. A spring, not shown, may be inserted within one end of channel lift assembly 12, if desired, to biasedly compress the adjuster knives 14 toward one end of channel lift assembly 12. The number of adjuster knives 14—forty—is determined by the number of intervals between form knives 13.

The form knives 13 are the hammer elements which will contact at their lower heads the workpiece ribbon cable 15 to form the conductors therein against anvil form block 16. Momentarily referring to FIGS. 3a and 3b, the knife 30 shown is of the typical construction of one of the form knives 13. The tabs 31 of form knives 13 are held within a Y axis channel within form head housing 10, shown in FIG. 2. They are constrained from movement relative to the form head housing 10 in the Z axis and also in the X axis by a cover plate, not shown, such as completes the other side of the constraining channel in a symmetrical manner to the side shown. The form knives 13 can slide along the Y axis within their constraining channel within form head housing 10. They are biased in this Y axis degree motional freedom by a spring 17 which compresses the form knives 13 toward one end of their constraining channel.

There are forty-one form knives 13 in the preferred embodiment which are separated by the forty adjuster knives 14. Both components have knife blade type wedge edges which are in sliding contact. An interval dividing operation which will space the form knives 13 evenly across a variable interval, such as the width of the ribbon cable 1, is performed as follows. Recall that the form knives 13 are captivated in a covered channel of form head housing 10 wherein their only degree of freedom is along the Y axis. Recall also that the adjuster knives 14 are captivated by the channel lift assembly 12 and can slide along the Y axis while they are moved in the Z axis through movement of the channel lift assembly 12. The spring 17 forces all knives against each other and against the ends of their respective channels. Vertical, Z axis, movement of channel lift assembly 12 is obtained by rotating threaded rods 11. This rotation is obtained by rotating internally threaded chain sprocket wheels 19 which are connected by chain 20 in order that rotation, and corresponding movement of each end of channel lift assembly 12, may be uniform and synchronized. Alternative drive means of effecting rotation are possible. The form head housing 10 is shown with metal relieved in order to suggest to the practitioner that a worm gear drive in such an area will also suffice to rotate the threaded rods 11. If a worm gear drive is employed the chain sprocket wheels 19 would not be driving elements but would rather be driven elements utilized to transmit torque from the driven one of threaded rods 11 to the other one. Many means of effecting bi-rotational motion of threaded rods 11, including direct drive, will be obvious to a practitioner in the art. The resultant raising or lowering in the Z axis of channel lift assembly 12 raises and lowers adjuster knives 14 which allows form knives 13 to compress under spring pressure or forces form knives 13 apart under knife pressure.

The technique by which form knives 13 are evenly arrayed across that actual interval represented by the current workpiece ribbon cable 1 involves reference, normally a visual reference, to that cable. The rear, or 41st, one of form knives 13 is compressively held against the side of form head housing 10 and will not move under any spacing adjustment. Therefore either the last, or 120th, conductor or workpiece ribbon cable 1 can be positioned under this last one of form knives 13, or the entire form head housing 10 may be moved in the Y axis relative to a fixed workpiece until this alignment is obtained. A provision for controllably positioning the workpiece along the Y axis will be taught in conjunction with FIG. 3. With the last one of form knives 13 positionally correctly aligned over the corresponding last conductor of workpiece ribbon cable 1, the separation of form knives 13 is then adjusted by raising or lowering adjuster knives 14. When the first one of form knives 13 is accurately positionally aligned over the first conductor of workpiece ribbon cable 1, then all forty-one of form knives 13 will be at equal separations.

The precision in the equality of the separations obtained is a function of the uniformity of the tapered surfaces of form knives 13 and of adjuster knives 14. When each set of knives is cut from the same base stock the uniformity can be excellent and the equality of the intervals achieved can be much more precise than is required to reliably contact wires at an approximate spacing of 0.0045 inches. Indeed this technique has obvious applications for the mechanical determination of intervals within a variable length wherein some fraction or some fractions of the total length are to be physically determined with great precision. If the form knives 13 were sharply pointed at their heads, instead of blunt as besuits their present purpose, it is obvious that the total length between the first and last knife has been divided into forty parts, or intervals, with considerable precision as demarked by such sharp points on the knife heads. Correspondingly, it is obvious that some one of modified form knives 13, say knife number 23, demarks twenty-three fortieths of the interval with the same considerable precision. There are obvious differences between the present technique and precise determination of an interval by measurement, or by the position of a follower along a precision screw which is rotated through a precise angle. In the first place, the present technique does not require measurement of the total interval—whether in units of distance or angular degrees of rotation of a precision screw—in order to intervalize and fractionate it. In the second place, several fractional intervals, not necessarily equal, can be simultaneously determined. In the third place, the present technique is subject to rapid, efficient, and accurate repetitive performance. Not only may variable intervals be readily divided, but the divisor may be altered dependent upon which number form knife (e.g. number 37, or 38, or 40, or 41) is used to demark the end of the interval. For large changes in interval or divisor substitute sets of knives would be used.

The unmeasured and variable length interval divided and segmented by the meshing knife sets of the present invention need not only be a straight linear interval, but can be a curved length or even the circumference of a circle. In the case of intervalizing a circle, both adjuster knives 14 and form knives 13 will be circularly arrayed and equal in number.

Figure 4:
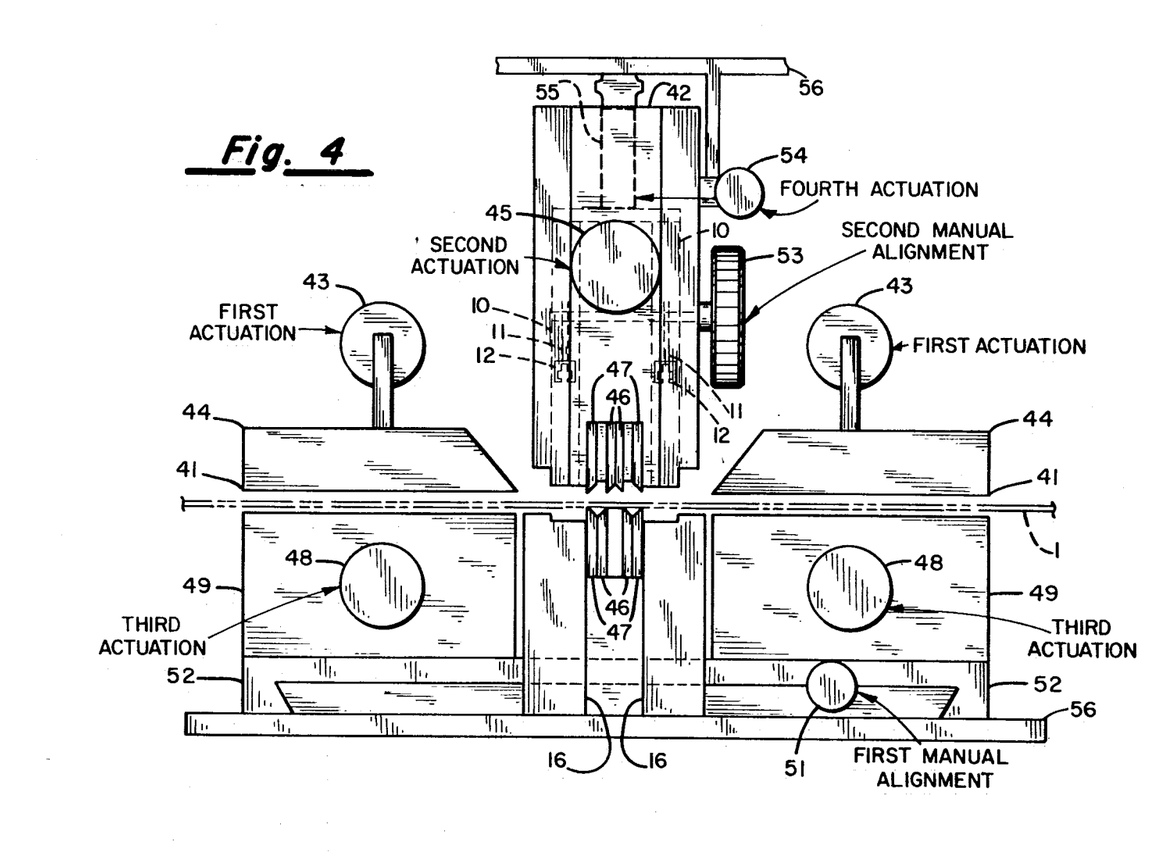
FIG. 4 shows a side view of two back to back ribbon cable form tools including forming heads plus anvil forming blocks in conjunction with a ribbon cable handling fixture, such combination as comprises multiconductor flat ribbon cable cutting, stripping, and end forming tool.
Figure 5:
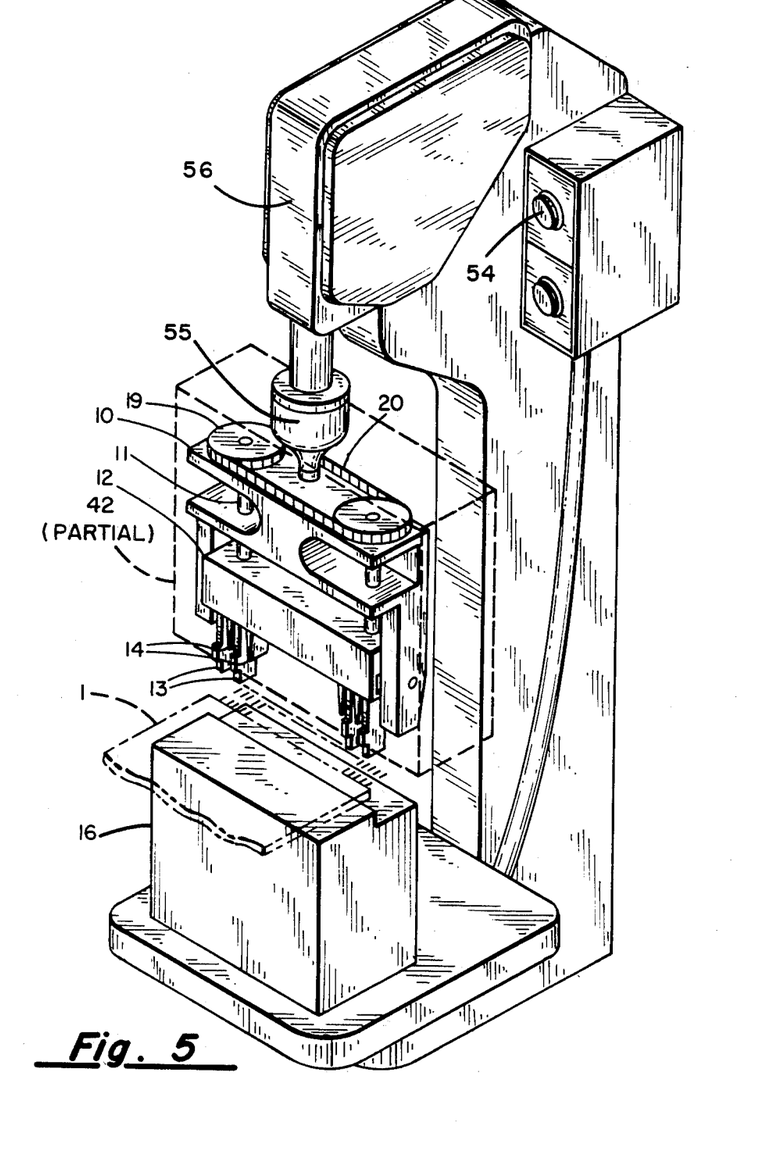

The actual forming operation is the final step in the utilization of the present invention as is shown in FIG. 2. The entire form head housing 10 is depressed in order that form knives 13 will form the wire ends of ribbon cable 1 against form block 16. The external motive force which is capable of causing compressive movement is not shown in FIG. 2 but various alternatives including manual force and hydraulics are considered routine to a practitioner in the art. In FIG. 4 an air solenoid method for actuating this movement of the entire form head housing 10 will be shown.

Figure 3C:
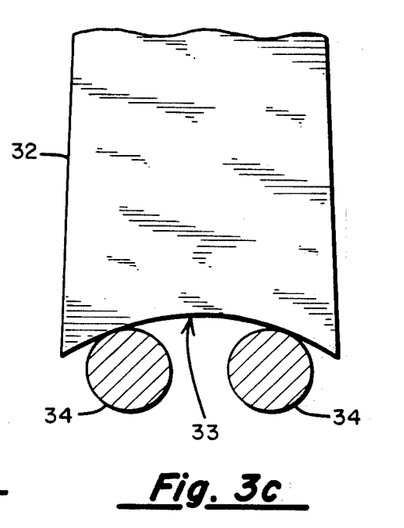
FIG. 3c shows, in much enlarged scale, the concave hammer head of a form knife contacting two conductors of the ribbon cable workpiece.

An improvement to the hammer head of form knives 13 in the present utilization is shown in FIG. 3c. The form knife 32 is shown with a circular concave head along the X axis, or direction of the formed wire. The nominal radius 33 of the circular arc is 0.020 inches such as could be formed by a #60 drill. The concave forming head enables the two contacted wires 34 to be most reliably contacted and bent, or formed, in the desired square edged contour.

Several variations on the forming operation are obvious. If any one(s) of form knives 13 has a truncated forming head—a forming head which is abbreviated to about the position of the tabs which maintain form knives 13 in channel lift assembly 12—then no contact will be made and no forming performed on the wire(s) underneath such placeholding but nonforming truncated form knives 13. If any one(s) of form knives 13 has a forming head aligned other than parallel to the X axis, and so mates with a correspondingly aligned seat(s) on form block 16, it is obvious that bent contours other than the approximate right angle form of FIG. 1b may be obtained. If any one(s) of the form knives 13 has a point or a die as a head it is possible to use the present apparatus for impressing marks across a width, as in the scribing of a rule, or to punch holes and the like at precision intervals. Most conventionally shaped stamping, punching, forming, scribing, and marking element heads are adaptable to the tapered element structure exhibited by form knives 13.

A semiautomated utilization of back to back ribbon cable forming tools, including the forming head and anvil forming block of FIG. 2 in conjunction with a ribbon cable holding and handling fixture, is shown in FIG. 4. This combination is capable of cutting, stripping, and end forming the multiconductors of flat ribbon cable. The machine performs all three operations in one cycle. A small section of cable is removed, severing the ribbon cable. Both ends adjacent the removed section are stripped. Then both are formed. In other words the second end of a first cable is formed simultaneously with the first end of a second cable. All motions accomplished, as by air cylinder actuation, are relative to a rigid frame (not shown).

The sequence of operations may be manually controlled, or it is routine in the art to stepwise automatedly sequence the air cylinders as will effect the desired motions. The workpiece ribbon cable 1 is firstly placed into the open front cavity 41 of the machine until it abuts firmly against the back stops (not shown). In such position it is under the cut, strip and form head 42 which form head 42 is but an enlargement of, and rigidly contains, form head housing 10 previously seen in FIG. 2. A foot pedal (not shown) may be depressed to start a logical sequence of actuations of the several air cylinders as will be shown, or each actuation may be manually actuated. Firstly actuated are clamp air cylinders 43 which compressively force cable clamps 44 against both ends of ribbon cable 1 and hold it stationary. Secondly actuated is cut and strip air cylinder 45 which forces downwards the upper against the stationary lower cut knives 46. Note the small separation between the left and right set of cut knives 46 shown in FIG. 4 in order to observe that when ribbon cable 1 is cut a small section across the width of the cable is actually severed and is discarded as it falls away. Simultaneously with the cutting occurring from the actuation of cut and strip cylinder 45, the upper strip knives 47 are forced toward the lower so that they indent into the insulation of ribbon cable 1. These strip knives 47 stop against a deadman stop, which may be made adjustable by the practitioner so that best even penetration of the insulation is made.

Thirdly actuated are X axis slide cylinders 48 which force the entire left and right X axis slide assemblies 49 apart a set distance. Since ribbon cable 1 is still clamped between cable clamps 44 and X axis slide assemblies 49, it is pulled through strip knives 47 and the insulation is removed from all conductors. Furthermore, X axis slide assemblies 49 stop their travel against limits when the stripped conductors are positioned between form blocks 50 and under the form knives 13 (shown in FIG. 3) of form head housing 10.

Automated sequencing, if it has been employed, must pause at this point for manual adjustments prior to end forming. Of course, an automated sense and control circuit might be designed to perform the following observations and alignments but the teaching of such is beyond the scope of this specification disclosure. A first operation aligns the backside conductor of ribbon cable 1 under the last one of form knives 13 (shown in FIG. 3) part of form head housing 10 by turning Y axis knob 51, which is connected to a screw. This moves the entirety of X axis slide assemblies 49, cable clamps 44, and the now stripped ribbon cable 1 along the Y axis on Y axis slides 52. The operator may be aided in performing this alignment by an optical magnifying microscope, or by an optic fiber or the like. Note that this preferred embodiment need utilize only one Y axis adjustment for aligning the two cable ends as are held on the left and right sides because, recently having been severed from a single cable, these ends exhibit veritably identical spacing of contained conductors, and are held in clamps.

Next in manual adjustment, the front one of form knives 13 (shown in FIG. 3) is aligned over the first, front-most conductor of ribbon cable 40 by turning the form adjust knob 53. This form adjust knob 53 is equivalent in function to chain sprocket wheels 19 shown in FIG. 2—it serves to force the adjuster knives 14 into the form knives 13 and thusly vary their separation. All knives are justified over the conductors of ribbon cable 1 when this adjustment is made. The actual linkage by which a form adjust knob 53 may be side mounted for operator convenience yet control the threaded rods 11 as shown in FIG. 2 is a simple worm gear.

With the forming head 42, which rigidly incorporates form head housing 10 previously seen in FIG. 2, now justified over the wire ends of left and right parts of ribbon cable 1 the operator presses thumb button 54 near form adjust knob 53 to cause Z axis form cylinder 55, shown in outline only, and located behind cut and strip cylinder 45, to fourthly actuate and force the entire form head 42 down toward form blocks 50, forming the cable. Then the thumb button 54 is released, signalling the end of cycle. The Z axis component of form head 42 returns to its top position under control of Z axis form cylinder 55. The cable clamps 44 release ribbon cable 1 under the control of clamp cylinders 43. The X axis slide assemblies 49 return to their starting, close together, position under the control of X axis slide cylinders 48. The operator removes the formed cable ends from the machine and starts the entire process over upon emplacing a new section of ribbon cable 1 within the machine.

It is obvious that all sequential steps may be performed under manually switched control. The interconnect of switches to control mechanical motion as effectuated by solenoid valve air cylinders or the like is considered routine in the art. It is also obvious that certain staged operations of the present invention may be automatically sequenced without departing from the true spirit of the operation and apparatus taught, that is, a method and tool for the rapid, repetitive and sequential cutting, stripping and wire end forming of a multi-conductor ribbon cable.

What is claimed is:

1. A method of segmenting a length by physically locating a plurality of movable elements demarking the end points of a plurality of segments along said length, said method comprising:

lining up linearly sequentially along said length a plurality of identical placeholding position-demarking first elements;

fixing a first sequential one of said plurality of first elements at a position demarking a first end of said length;

constraining the remaining linear sequentially lined-up ones of said first elements to a single degree of motional freedom along said length;

compressively forcefully biasing said constrained linear sequential lined-up ones of said first elements along said single degree of lengthwise motional freedom toward said fixed first sequential one of said plurality of first elements;

lining up linearly sequentially along said length a plurality, one less in number than said plurality of first elements, of identical wedge element means;

progressively interspersedly forcing all said plurality of wedge element means between all said plurality of first elements in order to evenly progressively spread by wedging said plurality of first elements against said compressive biasing until the last sequential one of said plurality of first elements moves to a position demarking a second end of said length; and demarking segments within said length between a first end point which is one of said plurality of position-demarking first elements as are evenly justified along said length and a second end point which is any other one of said plurality of position-demarking first elements as are evenly justified along said length;

whereby said demarked segments are in length integral multiples of that common fraction of said whole length which is said whole length divided by the number of said plurality of wedge element means.

2. The length segmenting method of claim 1 wherein said demarking further comprises:

fixing said last sequential one of said plurality of first elements at said position demarking said second end of said length.

3. The length segmenting method of claim 1 wherein said demarking further comprises:

demarking segments between all adjacent ones of said plurality of position-demarking first elements in order that said length be segmented into a plurality of equal parts equal in number to said plurality of wedge element means.

4. A method of partitioning an interval of unmeasured and variable length into a plurality of segments each of which is in length an integral multiple of a common fraction $1/N$ of said total interval length by physically locating movable elements demarking the ends of all said segments within said variable length interval, said method comprising:

arraying a plurality of $N+1$ identical first knife elements sequentially along said variable length interval;

arraying a plurality of $N$ identical second knife elements sequentially along said variable length interval;

fixing a first sequential one of said plurality of said first knife elements at the first end of said variable length interval;

fixing a last sequential one of said plurality of first knife elements at the second end of said variable length interval;

compressively forcing knife edge to knife edge said arrayed plurality of $N$ second knife elements fully evenly interspersedly into said arrayed plurality of $N+1$ first knife elements until both said evenly interspersed arrayed pluralities jointly tightly fill said variable length interval between said fixed first sequential one and said fixed last sequential one of said plurality of first knife elements; and demarking segments within said interval to be first ended at the position demarked by any one of said plurality of first knife elements and to be second ended at the position demarked by any other one of said plurality of first knife elements.

5. The method of claim 4 for partitioning an interval wherein said step of arraying said plurality of first knife elements further comprises:
   arraying linearly along a linear variable length interval; and
wherein said step of arraying said plurality of second knife elements further comprises:
   arraying linearly along a linear variable length interval.

6. A method of partitioning an unmeasured and variable length circumference of a circle into a plurality of arc segments each of which is in length an integral multiple of a common fraction 1/N of said total circumferential length by physically locating movable elements demarking the ends of all said arc segments within said circumference, said method comprising:
   circularly arraying a plurality of N identical first knife elements sequentially along said variable length circumference;
   circularly arraying a plurality of N identical second knife elements sequentially along said variable length circumference;
   compressively forcing knife edge to knife edge said circularly arrayed plurality of N second knife elements fully evenly interspersedly into said plurality of N first knife elements until both said circularly arrayed pluralities jointly tightly fill said variable length circumference;
   demarking arc segments within said circumferential interval to be first ended at the position demarked by any one of said plurality of first knife elements and to be second ended at the position demarked by any other one of said plurality of first knife elements.

7. An apparatus for locating at even spacing a plurality of headed elements at points along a linear interval of variable length, which said plurality of headed elements are usefully so located because each is possessed of a head generally utilizable for forming, stamping, punching, embossing, or marking and the like if the element head is brought into contact with a workpiece, said apparatus for locating headed elements comprising:
   a frame:
   a plurality of N+1 headed elements constrained tightly by said frame in a first direction, constrained tightly within but movable relative to said frame in a second direction orthogonal to said first direction, and constrained loosely by said frame in a third direction orthogonal to said first direction and to said second direction, each possessed of a head generally utilizable for forming, stamping, punching, embossing, or marking and the like if the element head is brought into contact with a workpiece, each said headed element of equal dimensional extent in said third direction;
   first constraining means, operative relative to said frame and to said plurality of headed elements, for maintaining said plurality of N+1 headed elements in a first linear sequential array along a third-direction linear variable-length interval;
   a plurality of N identical separator knife elements constrained tightly by said frame in said first direction, constrained tightly within but movable relative to said frame in said second direction orthogonal to said first direction, and constrained loosely by said frame in said third direction orthogonal to said first direction and to said second direction;
   second constraining means, operative relative to said plurality of N separator knife elements, spaced from said first constraining means for maintaining said plurality of N separator knife elements in a second linear sequential array along said variable length interval;
   compressively biasing force means
      for first forcing in said third direction, operative relative to said frame and to said first constraining means, said plurality of headed elements maintained in said first linear sequential array by said first constraining means together, or
      for second forcing in said third direction, operative relative to said frame and to said second constraining means, said plurality of separator elements maintained in said second linear sequential array by said second constraining means together, or
      for both first forcing and second forcing;
   merging force means, operative relative to said frame and to said first constraining means and to said second constraining means, for moving in said second direction said second constraining means maintaining said linearly sequentially arrayed plurality of N separator knife elements toward said first constraining means maintaining said linearly sequentially arrayed plurality of N+1 headed elements in order that individual ones of said plurality of N+1 headed elements are progressively evenly separated against said compressive biasing force means by wedging action, and until said variable length interval is completely subtended by some ones of said plurality of headed elements.

8. The headed element locating apparatus of claim 7 which further comprises:
   first position fixing means, operative relative to said variable length interval, for locating the end one of a first end of said linearly sequentially arrayed plurality of N+1 headed elements at a first end of said variable length interval.

9. The headed element locating apparatus of claim 8 which further comprises:
   second position fixing means, operative relative to said variable length interval, for locating the end one of the second end of said linearly sequentially arrayed plurality of N+1 headed elements at the second end of said variable length interval.

10. The headed element locating apparatus of claim 7 wherein said plurality of N+1 headed elements further comprise:
   identical knife edges oppositely disposed from said heads.

11. The headed element locating apparatus of claim 10 which further comprises:
   first position fixing means, operative relative to said variable length interval, for locating the end one of a first end of said linearly sequentially arrayed plurality of N+1 headed elements at a first end of said variable length interval.

12. The headed element locating apparatus of claim 11 which further comprises:
   second position fixing means for locating the end one of the second end of said linearly sequentially arrayed plurality of N+1 head elements at the second end of said variable length interval.

13. An apparatus for forming a multiplicity of wire ends of a ribbon cable which comprises:
- a frame;
- a plurality of hammer forming elements, loosely constrained by said frame in a linear array, each element sized to form one or more of said multiplicity of wire ends;
- wedging divider means, loosely constrained by said frame and spaced apart from a plurality of hammer forming elements, comprising a plurality of identical wedges operative for evenly separating said plurality of hammer forming elements when each of said plurality of wedges is forced between respective adjacent ones of said plurality of hammer forming elements within said linear array;
- first forcing means, operative relative to said frame and to said plurality of hammer forming elements and said wedging divider means, for forcing said wedging divider means toward said plurality of hammer forming elements so that each of said plurality of identical wedges within said wedging divider means will be forced to a uniform degree between respective adjacent ones of said plurality of hammer forming elements, therein making that said plurality of hammer forming elements are evenly separated because identical wedges are forced therebetween adjacent ones of said plurality of hammer forming elements to a uniform degree;
- an anvil affixed to said frame;
- second forcing means, operative relative to said frame end and to said plurality of hammer forming elements and said anvil, for hammer forcing said plurality of hammer forming elements toward said anvil;
- wherein if a multiplicity of wire ends of a ribbon cable are disposed between said anvil and said plurality of hammer forming elements then said wire ends will be formed.

14. The apparatus according to claim 13 wherein said hammer forming elements further comprise:
- knife-edged surfaces tapering back from hammer heads; and
- wherein said wedging divider means further comprises:
  - knife-edged adjuster knives interspersedly evenly forced knife surface to knife surface between said knife-edged hammer forming elements.

15. The apparatus according to claim 14 wherein said hammer forming elements each sized to form one or more of said multiplicity of wires further comprise:
- a concave groove in the hammer head end so that said wire end or ends formed by said hammer forming element contact said hammer head within said groove.

16. The apparatus according to claim 13 wherein each said plurality of hammer forming elements each sized to form one or more of said multiplicity of wires further comprise:
- a hammer head forming element with a groove within the hammer head end thereof said forming element, said groove within said hammer head disposed so that said wire end or ends formed by said hammer forming element contact said hammer head within said groove.

17. An apparatus for simultaneously bendably forming in the Z axis between hammer elements and an anvil a multiplicity of wire ends within and across the Y axis variable width of a workpiece stripped ribbon cable longitudinally extending in the X axis, which apparatus comprises:
- a frame;
- a plurality of N+1 form knife means loosely constrained by said frame for presenting hammer forming heads to said wire ends upon said anvil, and for presenting knife edges oppositely to said hammer heads and parallel to the X axis;
- a plurality of N identically knife-edged separator knife means, constrained by said frame to be disposed between said plurality of N+1 form knife means, for wedging tapered surface to tapered surface between said knife edges of said plurality of form knife means;
- firstly Y axis movable and secondly Z axis movable relative to said frame first support means, operative relative to said frame and to said plurality of N+1 form knife means, for constraining said plurality of N+1 form knife means to line up in a linear sequential array along the Y axis on one flat side of said workpiece ribbon cable, and with hammer forming heads toward said workpiece ribbon cable;
- firstly Y axis movable and firstly and secondly Z axis movable relative to said frame second support means, operative relative to said frame and to said plurality of N separator knife means, for constraining said plurality of N separator knife means to line up in a linear sequential array;
- Y axis first movement effecting means, operative relative to said frame, for firstly moving along the Y axis said first and said second support means until the end one of a first end of said linearly sequentially arrayed flat side positioned plurality of form knife means is fixedly directly centered on a plane parallel to the X axis and the Z axis and intersecting a first edge one of said multiplicity of wires across said workpiece ribbon cable;
- biasing force means, operative relative to said frame and to said first support means, for forcing said remaining ones of said linear arrayed plurality of form knife means toward said fixed end one of said linearly arrayed plurality of form knife means;
- Z axis first movement effecting means, operative relative to said frame, for firstly moving along the Z axis said second support means evenly toward said first support means, so that said constrained linearly sequentially arrayed plurality of N separator knife means is evenly interspersedly forced between said constrained linearly sequentially arrayed plurality of N+1 form knife means, so that individual ones of said plurality of N+1 form knife means are progressively evenly separated against said biasing force means by wedging action, and until the end one of the second end of said linearly sequentially arrayed first side positioned plurality of form knife means is directly centered on a plane parallel to the X axis and the Z axis which plane intersects the last edge one of said multiplicity of wires across said workpiece ribbon cable;
- an anvil fixed relative to said frame on the other flat side of said ribbon cable workpiece; and
- Z axis second movement effecting means, operative relative to said frame, for secondly moving along the Z axis said first and said second support means evenly toward said anvil, therein moving the hammer forming heads of said evenly separated linearly sequentially arrayed plurality of form knife means toward said anvil, thereby hammer forming said multiplicity of wire ends across said Y axis variable width of said workpiece stripped ribbon cable.

18. A method of simultaneously forming across the extent of a variable interval a multiplicity of workpiece elements each of even dimension within and all evenly distributed across said variable extent interval, said method of the nature of arranging a plurality of hammer elements within a forming head and then forming said multiplicity of workpiece elements against an anvil, said method comprising:
- lining up linearly sequentially along said variable extent interval a plurality of hammer-headed identically knife-edged form knife elements;
- fixing a first sequential one of said lined up plurality of form knife elements in alignment over a first end one of said multiplicity workpiece elements evenly distributed across said variable extent interval;
- compressively forcing all remaining ones of said lined up plurality of form knife elements toward said fixed first sequential ones;
- lining up linearly sequentially along, and in evenly interspersed contact with the knife edges of, said lined-up linear sequential plurality of form knife elements a plurality of identically knife-edged separator knife elements;
- evenly progressively forcing said plurality of separator knife elements as evenly interspersed wedges between ones of said plurality of form knife elements until, by uniform wedging separation action against said compressive forcing, a last sequential one of said lined-up plurality of form knife elements is aligned over the second end one of said multiplicity of workpiece elements, wherein said alignment means that said lined-up first plurality of form knife elements now subtends said variable extent interval; and
- simultaneously forcefully moving all said lined-up variable-extent-interval-subtending plurality of form knife elements and an anvil forming surface together so that said multiplicity of workpiece elements evenly distributed across said variable extent interval and therebetween said plurality of form knife elements and said anvil may be formed.

19. A method of simultaneously forming across the extent of a variable interval a multiplicity of workpiece elements each of even dimension within and all evenly distributed across said variable extent interval, said method of the nature of arranging a plurality of hammer elements within a forming head and then forming said multiplicity of workpiece elements against an anvil, said method comprising:
- lining up linearly sequentially along said variable extent interval a plurality of hammer-headed identical knife-edged form knife elements;
- fixing a first sequential one of said lined-up plurality of form knife elements in alignment over a first end one of said multiplicity of workpiece elements evenly distributed across said variable extent interval;
- fixing a last sequential one of said lined-up plurality of form knife elements in alignment over a second end one of said multiplicity of workpiece elements evenly distributed across said variable interval;
- lining up linearly sequentially along, and in evenly interspersed contact with the knife edges of, said lined-up linear sequential plurality of form knife elements a plurality of knife-edged identical separator knife elements;
- even progressively forcing in evenly interspersed wedgings said plurality of separator knife elements as evenly interspersed wedges between ones of said plurality of form knife elements until, by uniform wedging separating action the interval between said fixed first sequential one and said fixed last sequential one becomes evenly filled by said lined-up plurality of form knife elements; and
- simultaneously forcefully moving all said evenly lined-up plurality of form knife elements and an anvil forming surface together in order that said multiplicity of evenly distributed workpiece elements contained therebetween may be formed.

20. Given a finite length line segment which may be either straight or curved, and if curved may be meandering or may be or regular curvature as a conical section, and whether meandering or of regular curvature may either be open with two end points or may be closed, which for the closed curves conical section are the ellipse or circle, a mechanical method of substantially evenly segmenting said finite length line segment by physically locating a plurality of moveable elements demarking the end points of a plurality of substantially even segments along said finite length of said line segment; said method comprising:
- first arraying sequentially along said finite length of said line segment a plurality of identical placeholding position-demarking first elements, each said first elements occupying a first length along said line segment but entire said plurality of said first elements being insufficient, in aggregate of said first lengths, to subtend entire said finite length of said line segment;
- if said line segment is open, meaning that it is possessed of two end points which are not coincident, then fixing a first sequential one of said plurality of first elements at a first position demarking a first end point of said two end points of said line segment, else if said line segment is closed, of which the closed curve of regular conical section is an ellipse or a circle then fixing a first sequential one of said plurality of first elements at a first position demarking an arbitrary point upon said closed line segment plus discarding from use a single one of said plurality of first elements, wherein for either said open line segment or said closed line segment there then exists a plurality, one less in number than said plurality of first elements, of spaces which are between adjacent ones of said remaining ones of said sequentially arrayed plurality of first elements;
- constraining the remaining ones of said sequentially arrayed plurality of first elements to a single degree of motional freedom which is everywhere along said finite length line segment;
- compressively forcefully biasing said remaining ones of said sequentially arrayed plurality of first elements along said single degree of motional freedom toward said fixed first sequential one of said plurality of first elements;
- second arraying sequentially along said finite length of said line segment a plurality, one less in number than said plurality of first elements, of identical knife-edged second elements, each said second elements occupying a second length along said line segment but entire said plurality of said second elements being insufficient, in aggregate of said second lengths, to subtend entire said finite length of said line segment;

evenly progressively jointly interspersedly forcing all said plurality of second elements between all said plurality of first elements in order to evenly progressively spread, by wedging, said plurality of said first elements against said compressive biasing until if said line segment is open then the last sequential one of said plurality of first elements moves to a second position demarking a second end point of said two end points of said line segment else if said line segment is closed then the last sequential one of said plurality of second elements moves to a position tightly adjacent said fixed first sequential one of remaining said plurality of first elements, wherein for either said open line segment or said closed line segment, said aggregate said first lengths of remaining said plurality of first elements plus aggregate said second lengths of said plurality of second elements equals, in total, said finite length of said line segment; and demarking one or more sub-segments within said finite length line segment to each be defined by a first end point which is one of remaining said plurality of first elements and by a second end point which is another one of remaining said plurality of first elements, which first elements are now evenly justified along said finite length of said line segment;

whereby each said sub-segments so demarked are in length integral multiples of that common fraction of entire said finite length, which said common fraction is said entire said finite length divided by the number of said plurality of second elements.

* * * * *

UNITED STATES PATENT AND TRADEMARK OFFICE
CERTIFICATE OF CORRECTION

PATENT NO. : 4,572,250
DATED : February 25, 1986
INVENTOR(S) : Duane K. Maben

It is certified that error appears in the above-identified patent and that said Letters Patent is hereby corrected as shown below:

Column 11, Line 46, ":" should be -- ; -- .

Column 13, Line 9, "a" should be -- said -- .

Column 13, Line 32, delete "end".

Column 13, Line 42, "fromhammer" should be -- from hammer -- .

Column 15, Line 16, insert -- of -- after "multiplicity".

Signed and Sealed this

Twentieth Day of May 1986

[SEAL]

Attest:

Attesting Officer

DONALD J. QUIGG

Commissioner of Patents and Trademarks